US010339121B2

(12) United States Patent
Verma

(10) Patent No.: US 10,339,121 B2
(45) Date of Patent: Jul. 2, 2019

(54) DATA COMPRESSION

(71) Applicant: SAP SE, Walldorf (DE)

(72) Inventor: Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 611 days.

(21) Appl. No.: 14/860,678

(22) Filed: Sep. 21, 2015

(65) Prior Publication Data

US 2017/0039229 A1 Feb. 9, 2017

(30) Foreign Application Priority Data

Aug. 6, 2015 (IN) ........................... 4083/CHE/2015

(51) Int. Cl.
*G06F 17/30* (2006.01)
*G06F 16/22* (2019.01)
*G06F 16/215* (2019.01)

(52) U.S. Cl.
CPC ............ *G06F 16/22* (2019.01); *G06F 16/215* (2019.01)

(58) Field of Classification Search
CPC ......... G06F 17/30312; G06F 17/30303; G06F 16/215; G06F 16/22
USPC .................................. 707/E17.002, 693, 692
See application file for complete search history.

(56) References Cited

U.S. PATENT DOCUMENTS 5,434,568 A * 7/1995 Moll ....................... G06T 9/005 341/63
5,951,623 A * 9/1999 Reynar ................... G06T 9/005 341/106
5,977,890 A * 11/1999 Rigoutsos ................ G06K 9/62 341/55
6,018,738 A * 1/2000 Breese ................... G06Q 30/06 706/11
6,055,526 A * 4/2000 Ambroziak ....... G06F 17/30622 707/693
6,473,774 B1 * 10/2002 Cellis ................ G06F 17/30339
6,661,839 B1 * 12/2003 Ishida .............. G01R 31/31921 341/51
7,739,275 B2 * 6/2010 Dubinko ........... G06F 17/30864 707/723
8,653,993 B2 * 2/2014 Bendel .................... H03M 7/30 341/50
2005/0187916 A1 * 8/2005 Levin ........................ G06F 7/02
2008/0071748 A1 * 3/2008 Wroblewski ...... G06F 17/30448
2008/0102859 A1 * 5/2008 Karr ...................... G01S 13/825 455/456.3

(Continued)

*Primary Examiner* — Shiow-Jy Fan
(74) *Attorney, Agent, or Firm* — Buckley, Maschoff & Talwalkar LLC

(57) ABSTRACT

Methods and system are disclosed that compress a dataset and optimize the dataset for searching data. In one aspect, based on attributes associated with a unified dataset, the dataset including sensor node identifier data, sensor node timestamp data and sensor measurement data are determined. A suffix tree algorithm may be executed to determine data compression logic to compress the dataset including the sensor node identifier data and sensor node measurement data. A sensor node timestamp data compression model may be executed to compress the dataset associated with the sensor timestamp data. The compressed datasets including the sensor node identifier data, the sensor node timestamp data and the sensor measurement data may be stored in an in-memory data store.

22 Claims, 9 Drawing Sheets

(56) References Cited

U.S. PATENT DOCUMENTS

| | | | | |
|---|---|---|---|---|
| 2008/0294863 | A1* | 11/2008 | Faerber | H03M 7/3084 711/170 |
| 2009/0174583 | A1* | 7/2009 | Diaz-Gutierrez | H03M 7/40 341/65 |
| 2009/0254521 | A1* | 10/2009 | Raman | H03M 7/40 |
| 2010/0287165 | A1* | 11/2010 | Halpern | G06F 17/30312 707/741 |
| 2011/0218978 | A1* | 9/2011 | Hong | G06F 17/30551 707/694 |
| 2012/0197852 | A1* | 8/2012 | Dutta | H04L 67/2804 707/692 |
| 2012/0197898 | A1* | 8/2012 | Pandey | G06F 17/30333 707/741 |
| 2013/0033389 | A1* | 2/2013 | Bendel | H03M 7/30 341/50 |
| 2014/0122022 | A1* | 5/2014 | Chen | H04L 67/12 702/181 |
| 2015/0178305 | A1* | 6/2015 | Mueller | G06F 17/30129 707/693 |

* cited by examiner

| SENSOR ID | TIMESTAMP | MEASUREMENT |
|---|---|---|
| 1 | 20141017145610 | 10 |
| 2 | 20141017145610 | 10 |
| 1 | 20141017145611 | 10 |
| 2 | 20141017145611 | 11 |
| 2 | 20141017145612 | 10 |
| 1 | 20141017145612 | 11 |
| 1 | 20141017145613 | 10 |
| 2 | 20141017145613 | 11 |
| 1 | 20141017145614 | 10 |
| 2 | 20141017145614 | 11 |
| 1 | 20141017145615 | 10 |
| 2 | 20141017145615 | 10 |
| 1 | 20141017145616 | 10 |
| 2 | 20141017145616 | 10 |

102 104 106

TABLE 1

FIG. 1

| | SESNOR ID | TIMESTAMP | MEASUREMENT | |
|---|---|---|---|---|
| N1 | 1 | 20141017145610 | 10 | |
| | 2 | 20141017145610 | 10 | |
| | 3 | 20141017145610 | 10 | I |
| | 4 | 20141017145610 | 11 | |
| N2 | 1 | 20141017145611 | 10 | |
| | 2 | 20141017145611 | 11 | |
| | 3 | 20141017145611 | 10 | |
| | 4 | 20141017145611 | 11 | |
| N3 | 1 | 20141017145612 | 10 | |
| | 2 | 20141017145612 | 11 | |
| | 3 | 20141017145612 | 10 | |
| | 4 | 20141017145612 | 10 | |
| | 602 | 604 | 606 | |

TABLE 1

| START TIME | NUMBER OF INTERVALS | INTERVALS | NUMBER OF SENSOR NODES |
|---|---|---|---|
| 20141017145610 | 3 | 1 | 4 |
| 608 | 610 | 612 | 614 |

TABLE 2

FIG. 6

| SESNOR ID | TIMESTAMP | MEASUREMENT |
|---|---|---|
| 1 | 20141017145610 | 10 |
| 2 | 20141017145610 | 10 |
| 3 | 20141017145610 | 10 |
| 4 | 20141017145610 | 11 |
| 1 | 20141017145611 | 10 |
| 2 | 20141017145611 | 11 |
| 3 | 20141017145611 | 10 |
| 4 | 20141017145611 | 11 |
| 1 | 20141017145612 | 10 |
| 2 | 20141017145612 | 11 |
| 3 | 20141017145612 | 10 |
| 4 | 20141017145612 | 10 |
| 2 | 20141017145613 | 11 |
| 3 | 20141017145613 | 10 |
| 4 | 20141017145613 | 10 |

B1 (last three rows)

702 704 706

TABLE 1

| START TIME | NUMBER OF INTERVALS | INTERVALS | NUMBER OF SENSOR NODES |
|---|---|---|---|
| 20141017145610 | 3 | 1 | 4 |
| 20141017145613 | 1 | 1 | 1 |

708 710 712 714

TABLE 2

FIG. 7

| START TIME | NUMBER OF INTERVALS | INTERVALS | NUMBER OF SENSOR NODES |
|---|---|---|---|
| 20141017145610 | 3 | 1 | 4 |
| 20141017145613 | 10 | 1 | 3 |
| 20141017145623 | 20 | 1 | 4 |
| 20141017145642 | 17 | 1 | 3 |
| 20141017145659 | 23 | 1 | 4 |
| 20141017145681 | 5 | 10 | 3 |
| 20141017145731 | 15 | 10 | 4 |
| 802 | 804 | 806 | 808 |

TABLE 1

| START TIME | START ROW POSITION | INTERVALS | NUMBER OF SENSOR NODES |
|---|---|---|---|
| 20141017145610 | 0 | 1 | 4 |
| 20141017145613 | 12 | 1 | 3 |
| 20141017145623 | 42 | 1 | 4 |
| 20141017145642 | 122 | 1 | 3 |
| 20141017145659 | 173 | 1 | 4 |
| 20141017145681 | 265 | 10 | 3 |
| 20141017145731 | 280 | 10 | 4 |
| 810 | 812 | 814 | 816 |

TABLE 2

FIG. 8

DATA COMPRESSION

RELATED APPLICATIONS

This application claims priority from Indian Provisional Patent Application No. 4083/CHE/2015, filed on Aug. 6, 2015, in the Indian Patent Office, the disclosures of which are incorporated herein by reference in their entireties.

BACKGROUND

Advancements in database technologies and data compression techniques have provided efficient means for data storage. For instance, data may be compressed using known data compression techniques and stored in a database. However, there may be no provision or mechanism to identify or classify data based on data sources. In such a scenario known data compression techniques may be inefficient and the mechanism to search for such compressed data may be cumbersome. Determining data sources, data compression techniques based on the attributes of data, and optimizing the search for data may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 1 is a block diagram illustrating a table including sensor dataset, according to an embodiment.

FIG. 6 is a block diagram showing compression of sensor node timestamp data, according to an embodiment.

FIG. 7 is a block diagram showing compression of sensor node timestamp data, according to an embodiment FIG. 8 is a block diagram showing tables including compressed dataset for sensor node timestamp data, according to an embodiment.

DETAILED DESCRIPTION

Figure 2:
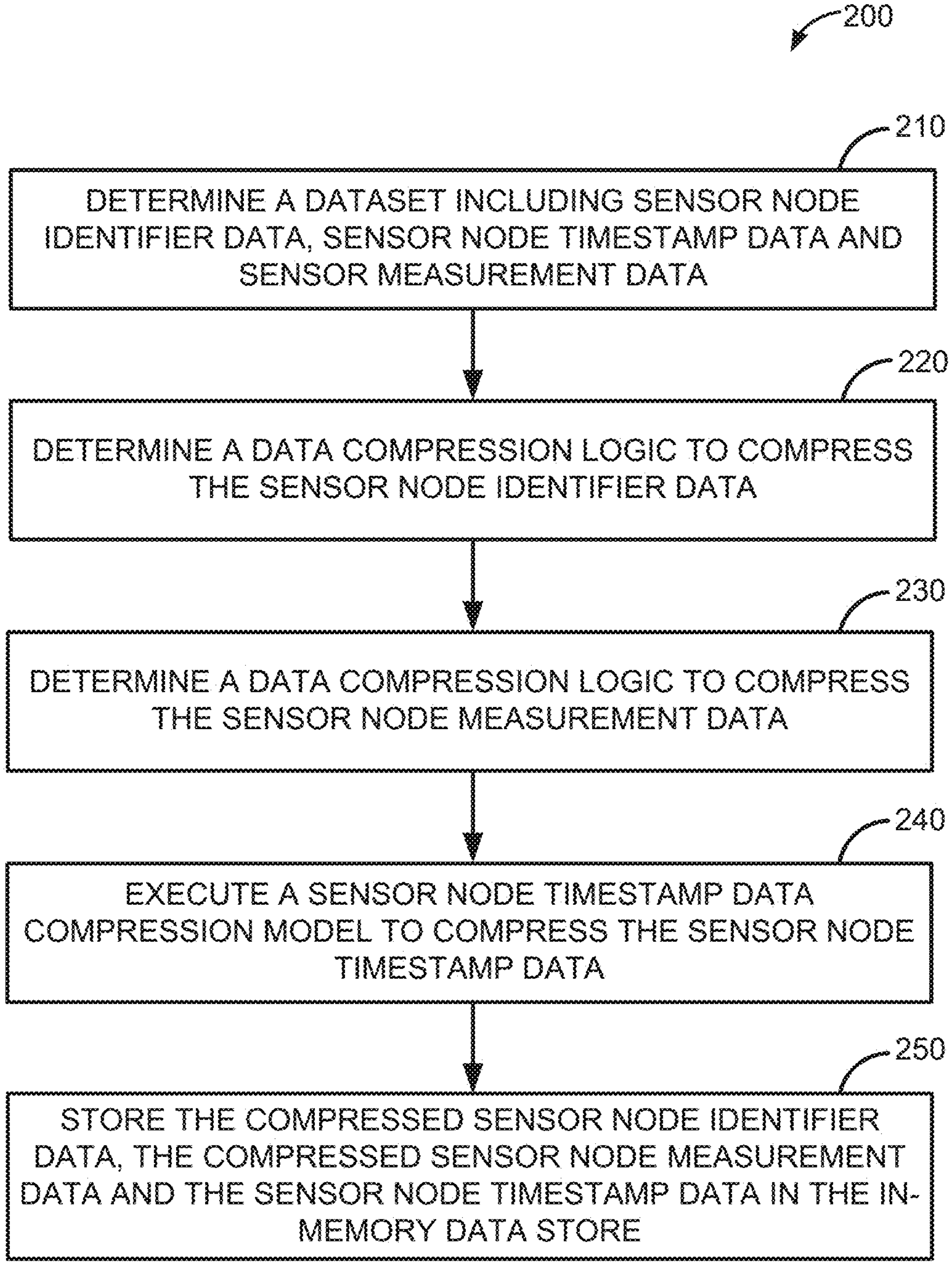
FIG. 2 is a flow diagram illustrating a process to compress a dataset, according to an embodiment.

Embodiments of techniques related to data compression are described herein. In the following description, numerous specific details are set forth to provide a thorough understanding of the embodiments. One skilled in the relevant all will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Volume of business data associated with an enterprise may witness an exponential surge as a function of time. The business data may be structured and unstructured data, transactional data, data related to business processes, etc. A data store may correspond to an in-memory database, a web-based database, a conventional database, etc. The in-memory database may include a main memory and an underlying hardware for executing storage and computational operations. Typically, the business data may be available in the main memory and operations such as, computations and memory-reads may be executed in the main memory.

In an embodiment, a table in a database may be represented by a two dimensional data structure with cells organized in rows and columns. For instance, the business data in the in-memory database may be stored as a row store or a column store. In the row store, the fields of every row may be stored sequentially, while in the column store, the fields of every column may be stored in contiguous memory locations. Storage modeled as row store or column store may be accessed by various components of the in-memory management system. Such components may include front-end development application, database application, a query processing engine, etc.

In an embodiment, when data is stored in the column store, the values associated with business data may be intrinsically sorted and stored in several contiguous locations that may be adjacent to each other. In an embodiment, an in-memory data store may store data from multiple data sources in multiple data formats. Such data may be referred to as unified dataset and may be associated with multiple attributes. For instance, dataset associated with enterprise resource planning (ERP) data may be determined or identified by the attributes associated the ERP data; dataset associated with customer relationship management (CRM) data may be determined by the attributes associated with CRM data, and so on.

In an embodiment, the in-memory data store may reside in a data center that is in communication with multiple sensor nodes. A sensor node may correspond to a transducer that may be configured to sense (e.g., measure or detect) specific characteristic in an environment in which the sensor node is deployed. Such measurements may also be referred to as sensor measurement data that may be transmitted to the data center. Additionally, the data transmitted to the data center may include sensor node identifier data, sensor timestamp data, etc. For instance, such dataset may be referred to as sensor data or sensor information. Hence the sensor data may be determined by the associated attributes, such as sensor node identifier, sensor node timestamp information and sensor measurement information. The sensors may be deployed in a network (e.g., Internet of Things (IoT)) of a connection of smart objects or devices such as electronic devices, software, etc., that exchange data with each other.

In an embodiment, the sensor data transmitted from the multiple sensor nodes may be received and stored in a delta storage associated with the in-memory data store. The delta storage may be configured to receive the sensor data at a particular frequency and at particular time intervals. Upon receiving the sensor data, a business logic associated with the delta storage in the in-memory data store may sort the dataset including the sensor data based on the sensor timestamp information. Upon sorting the dataset based on the sensor timestamp information, the dataset including the senor data may be merged with a main storage associated with the in-memory data store.

In an embodiment, the in-memory data store may execute a data merge model to merge the dataset collected in the delta storage with the main storage in the in-memory data store. In an embodiment, the data in the main storage may be stored as row store Of column store. The data stored in the main storage may be compressed by executing data compression models. For instance, a dataset stored in the in-memory data store may be &let mined by attributes associated with the dataset and a data compression model may be determined and executed to compress the corresponding dataset.

FIG. 1 is a block diagram illustrating a table including sensor dataset, according to an embodiment. By way of illustration, FIG. 1 shows table 1 including dataset stored in an in-memory data store in a datacenter. In an embodiment, the dataset in Table 1 corresponds to sensor measurement data. The dataset in Table 1 may be stored in column stores in the in-memory data store. As shown, table 1 includes column store "SENSOR ID" 102 that represents the sensor node identifier information; column store "TIMESTAMP" 104 that represents the sensor node timestamp information; column store "MEASUREMENT" 106 representing the sensor node measurement information. In an embodiment, based on a proximity of deployment of the sensor nodes from the datacenter and a data transmission frequency of the sensor nodes, the sensor nodes may transmit the sensor measurement data to the data center. Such sensor measurement data may include different types of data patterns.

FIG. 2 is a flow diagram illustrating process 200 to compress a dataset, according to an embodiment. Process 200, upon execution compresses dataset associated with sensor data. In an embodiment, based on the attributes associated with the unified dataset, a dataset including sensor node identifier data, sensor node timestamp data and sensor measurement data is determined, at 210. The sensor identifier data, the sensor node timestamp data and the sensor measurement data may be determined based on the attributes. To compress the dataset including the sensor data, data compression logic may be determined. The data compression logic may be determined by executing an algorithm or a model.

In an embodiment, the data compression logic is determined by executing a suffix tree algorithm. The suffix tree algorithm may be executed to determine a data compression logic based on the properties (e.g., type of data pattern, frequency of data transmission from the sensor nodes, etc.) associated with the dataset. In an embodiment, a data compression logic (e.g., a first data compression logic) to compress the sensor node identifier data is determined, at 220. A data compression logic (e.g., a second data. compression logic) to compress the sensor node measurement data is determined, at 230. In an embodiment, a sensor node timestamp data compression model is executed to compress the sensor node timestamp data, at 240. In an embodiment, the suffix tree algorithm may be executed to determine the data compression logic (e.g., first data compression logic, second data compression logic, etc.). The compressed dataset (e.g., datasets associated with sensor node identifier, sensor node timestamp and sensor measurement) is stored in the in-memory data store, at 250.

Compression of Sensor Node Identifier Data

In an embodiment, the sensor nodes may transmit data including sensor node identifier data to a data center. The sensor node identifier data may include multiple different types of data patterns. By way of example, the sensor node identifiers may be represented by integers (e.g., '1', '2', '3', '4', etc.) and may be compressed based on a data compression logic. The data compression logic to compress the Sensor node identifier data may be based on a determination of the types of data patterns associated with the sensor node identifier data.

In an embodiment, the types of data patterns associated with the sensor node identifier data may depend on the data transmission frequency from the sensor nodes. Hence, determining the data compression logic (e.g., first data compression logic) to compress the dataset including the sensor node identifier data may include determining data transmission frequency from the multiple sensor nodes. Based on the data transmission frequency, the sensor node identifier data may include multiple types of data patterns (e.g., first type of data pattern, second type of data pattern, and so on). Such types of data patterns may also depend on proximity of deployment of the sensor nodes from the data center.

Figure 3:
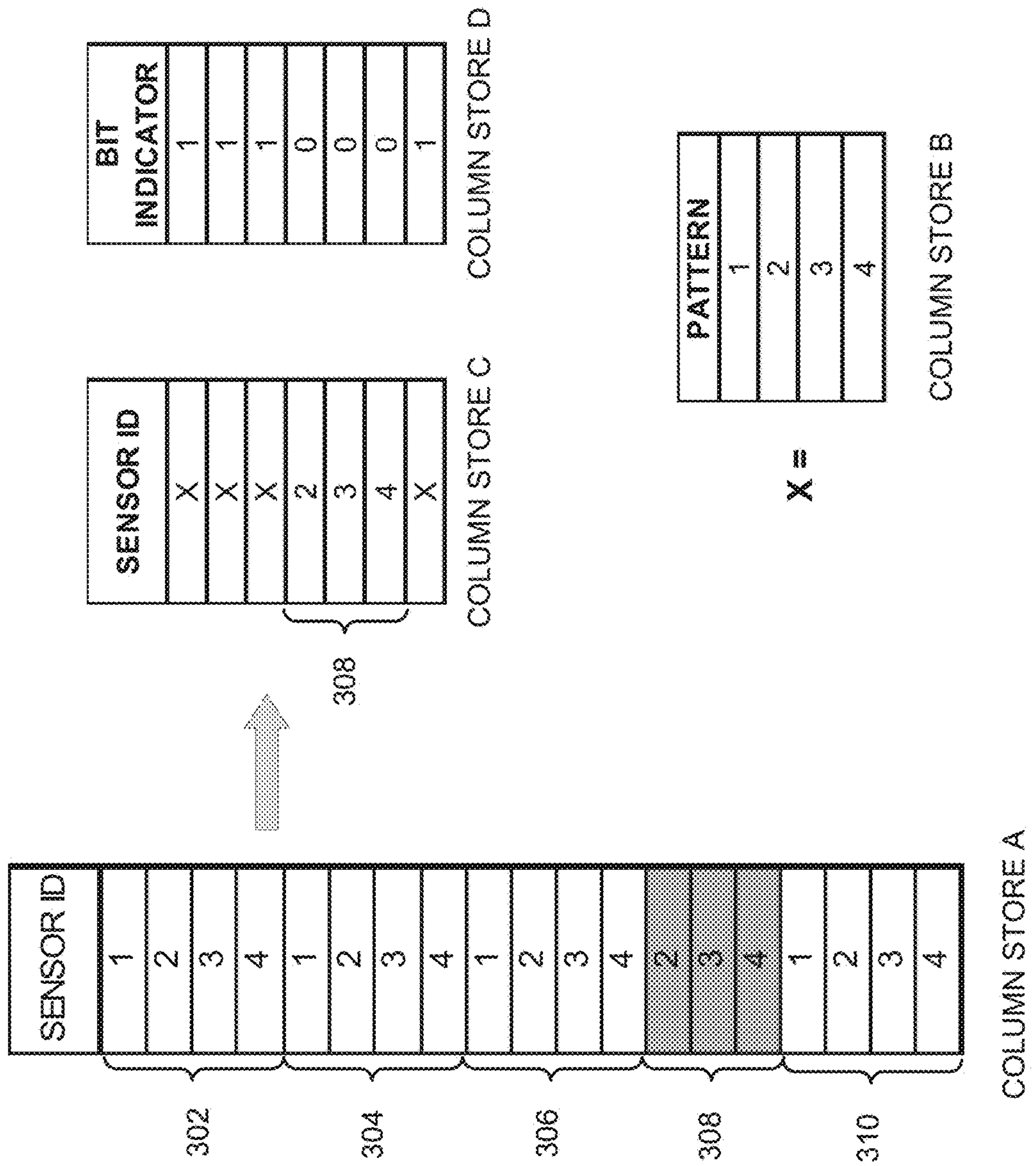
FIG. 3 is a block diagram illustrating compression of sensor node identifier data, according to an embodiment.

FIG. 3 is a block diagram illustrating compression of sensor node identifier data, according to an embodiment. FIG. 3 shows a column store A including sensor node identifier data. By way of illustration, FIG. 3 shows the column store A stores sensor node identifier data as integers represented by '1', '2', '3', '4', etc. As discussed previously, based on the proximity of deployment of the sensor nodes and the data. transmission frequency of the sensor nodes, the data transmitted by the sensor nodes to the data center may include different types of data patterns.

By way of illustration, column store A shows a finite dataset of sensor node identifiers '1234123412342341234'. The column store A including the sensor node identifier dataset may be traversed and the different types of data patterns (e.g., 302, 304, 306, 308 and 310) may be determined. Further, frequently repetitive types of data patterns may be determined. By way of example, one such repetitive type of data pattern may include '1234', with a count of 4, since the type of data pattern '1234' occurs 4 times in column store A.

In an embodiment, upon determining the frequently repetitive type of data pattern (e.g., 302, 304, 306 and 310), the data compression logic to compress the dataset may be determined. The frequently repetitive type of data pattern may be encoded by a bit-coding scheme or bit-coding logic. In an embodiment, upon encoding the sensor node identifier data, a table including a coded type of data pattern associated with the sensor node identifier and a bit-code indicator may be generated. The bit-coded dataset may represent compressed sensor node identifier dataset.

In an embodiment, an amount of memory utilized or consumed to store sensor node identifier data shown column store A of FIG. 3 may be determined. By way of example, consider that the amount of memory consumed or utilized to store each row or entry of the dataset is 1 byte. Hence, the total amount of memory utilized or consumed to store the dataset of column store A of FIG. 3 may be computed to be equal to 19 bytes (e.g., as there are 19 records or entries in column store A of FIG. 3). Such memory utilization or consumption may be optimized by compressing the sensor node identifier dataset and storing the compressed dataset in the in-memory data store.

In an embodiment, to compress the dataset including the sensor node identifier data, the frequently repetitive type of data pattern (e.g., X of column store B) may be encoded with a bit-coding scheme or bit-coding logic. By way of illustration, column store C and column store D show the bit-coding logic for sensor identifier dataset of column store A of FIG. 3, according to an embodiment. As shown, the frequently repetitive type of data pattern may be determined, encoded and represented by an encoding variable. The encoding of the frequently repetitive type of data pattern may be based on a count (e.g., frequency of occurrence of a type of pattern of data) of the repetitive type of data pattern.

By way of illustration, FIG. 3 shows frequently repetitive type of data pattern is determined as ‘1234’, shown as column store. By way of example, the bit-coding logic may encode such pattern and represent by an encoding variable ‘X’. To compress the sensor node identifier dataset, the data compression logic may traverse through the sensor node identifier dataset to determine the occurrence of frequently repetitive type of data pattern. Upon determining an occurrence of the frequently repetitive type of data pattern, the data compression logic may replace the block or interval of dataset associated with the frequently repetitive type of data pattern with the encoding variable ‘X’. This is shown as column store C in FIG. 3.

In an embodiment, corresponding to each replaced block of dataset, a value ‘1’ may be stored in the bit-indicator column (e.g., column store D). The value ‘1’ in the bit-indicator column (e.g., column store D) indicates that the block of dataset corresponds to frequently repetitive type of data pattern and was encoded by the data compression logic. In an embodiment, when the block or interval of dataset (e.g., 308) does not match the frequently repetitive type of data pattern, the data compression logic may store values associated with the sensor node identifiers. By way of illustration, FIG. 3 shows a block or interval dataset 308 that fails to match with the frequently repetitive data pattern (e.g., column store B). In other words, block or interval of dataset 308 may indicate that sensor node with identifier ‘1’ failed to transmit data. In such instances, the corresponding sensor node identifiers are included in the sensor node identifier column (e.g., column store C) and a value ‘0’ may be included in corresponding row in the bit-indicator column (e.g., column store D). In an embodiment, the value ‘0’ in the bit-indicator column (e.g., column store D) may indicate the dataset failed to match with the frequently repetitive type of data pattern (e.g., column store B).

In an embodiment, the dataset including the sensor node identifier data (e.g., column store A of FIG. 3) may be compressed and stored in the in-memory data store. When the sensor node identifier dataset in column store A of FIG. 3 is compressed, the amount of memory utilized or consumed may be computed to be equal to 12 bytes (e.g., frequently repetitive type of data pattern column store=4 bytes+compressed dataset including the sensor node identifier data column store=7 bytes+bit indicator column store=1 byte).

Figure 4:
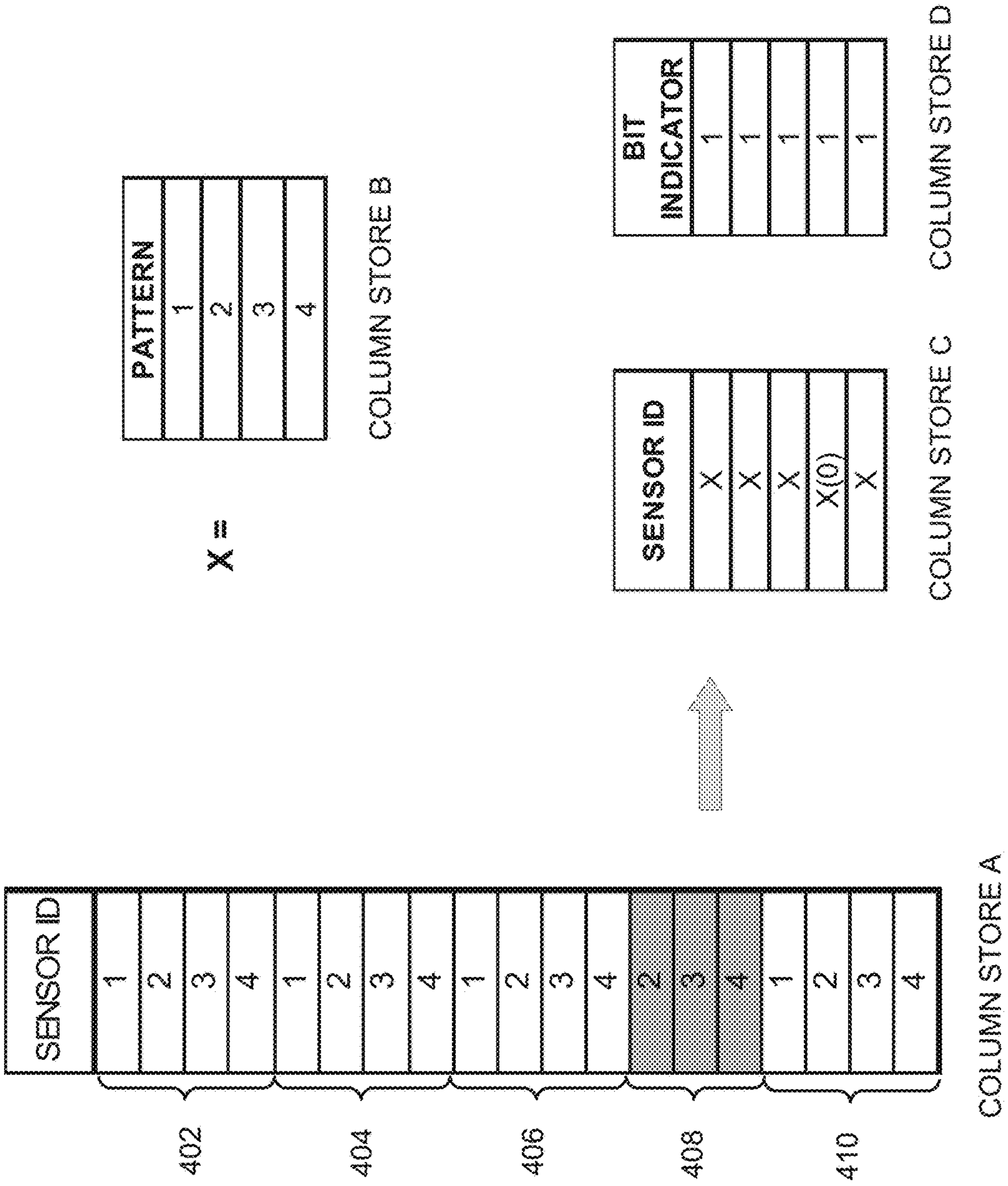
FIG. 4 is a block diagram showing compression of sensor node identifier dataset, according to an embodiment.

FIG. 4 is a block diagram showing compression of sensor node identifier dataset, according to an embodiment. By way of illustration, column store C and column store D show a bit-coding scheme or bit-coding logic to compress the sensor node identifier dataset. The data compression logic may encode the sensor node identifier dataset as explained previously (e.g., detailed description of FIG. 3). In an embodiment, the data compression logic may determine the position of a missing sensor node identifier in the frequently repetitive type of data pattern and may encode the sensor node identifier dataset using such position information. By way of example, in the frequently repetitive type of data pattern (e.g., column store B). ‘X (0)’ may indicate the position of missing sensor node with identifier ‘1’; ‘X(1)’ may indicate the position of sensor node with identifier ‘2’ and so on.

In an embodiment, the data compression logic may encode the sensor node identifier dataset as shown in column store C and column store D of FIG. 4. By way of illustration, ‘X (0)’ in the sensor node identifier column store C is encoded and stored with a value ‘1’ in the bit-indicator column store D. Such bit-coding logic may indicate that the corresponding block of sensor node identifier dataset (e.g., 408) partially matches the frequently repetitive type of data pattern (e.g., column store B in FIG. 4). Based on the above bit-coding logic, the value ‘1’ in the bit-indicator column store D associated with the encoded variable ‘X (0)’ in column store C may indicate that sensor node with identifier value ‘1’ failed to transmit data.

In an embodiment, the data compression logic may encode sub patterns sequence given in column store B with one element missing (e.g., all possible sub patterns from <‘1’, ‘2’, ‘3’, ‘4’> with one missing identifier are <‘2’, ‘3’, ‘4’> or <‘1’, ‘3’, ‘4’> or <‘1’, ‘2’, ‘4’> or <‘1’, ‘2’, ‘3’>). In such an instance, the data compression logic may respectively encode the missing sensor node identifier dataset and represent by encoding variables as ‘X (0)’, ‘X (1)’, ‘X (2)’ and ‘X (3)’ respectively. In an embodiment, such data compression logic that preserves the original data for recovery may also be referred to as lossless data compression.

In an embodiment, the amount of memory consumed or utilized for storing a compressed dataset corresponding to the each frequently repetitive type of data pattern, may be computed using the equation:

$$S=(N*\log_2(M)+R_c*\log_2(M)+R_c) \qquad \text{Equation (1)}$$

In the above equation, ‘S’ represents storage (e.g., in bits) utilized for a type of data pattern in compressed form; ‘N’ represents number of elements in the pattern; ‘M’ represents number of unique sensor node identifiers; ‘$R_c$’ represents number of row stores used for storing the compressed data.

In an embodiment, the sensor node identifier dataset may include multiple frequently repetitive types of data patterns, in such a scenario, the storage value ‘S’ (also referred to as a data compression score) may be computed for each distinct frequently repetitive type of data pattern and the data compression scores may be compared. In an embodiment, the data compression logic may be determined based on a comparison of the data compression scores.

In an embodiment, the frequently repetitive type of data patterns may be determined by execution of a suffix tree algorithm on the sensor node identifier dataset. The execution of suffix tree algorithm may generate a suffix tree (e.g., a suffix tree graph including the sensor node identifier dataset). The suffix tree may include nodes and paths connecting the nodes. In an embodiment, the nodes of the suffix tree may represent a count or number of occurrences of a specific type of data pattern.

In an embodiment, column store A of FIG. 4 may represent a finite dataset. For an infinite dataset (e.g., when count of entries in column store A is in millions or billions), the infinite dataset may be partitioned into finite datasets and frequently repetitive type of data patterns corresponding to each finite dataset may be identified. For each identified frequently type of data pattern in each finite dataset, the data compression scores may be computed, as explained previously. By way of example, the data compression scores for each frequently repetitive type of data patterns may be computed, compared and the data compression logic may be determined.

Figure 5:
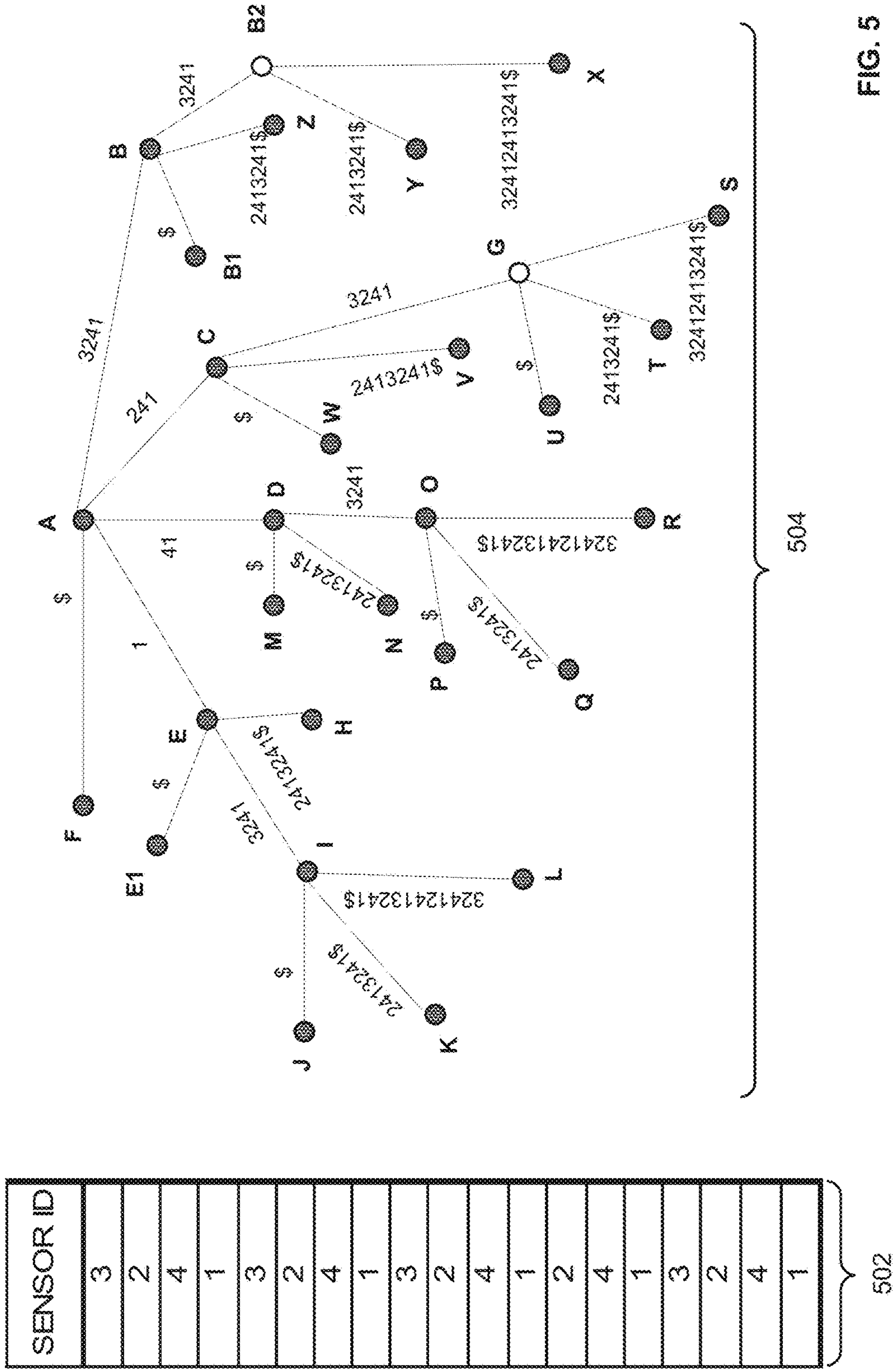
FIG. 5 is a block diagram of a suffix tree for sensor node identifier data, according to an embodiment.

FIG. 5 is a block diagram of a suffix tree for sensor node identifier data, according to an embodiment. By way of illustration, FIG. 5 shows a suffix tree graph 504 that is generated for senor node identifier data 502. As explained previously, the suffix tree graph 504 may be generated by executing the suffix tree algorithm on the sensor node identifier dataset 502. As shown, the suffix tree graph 504 includes nodes (e.g., 'A', 'B', 'D', 'E', 'F', 'G', 'H', 'I', 'J', 'K', 'L', 'M', 'N', 'O', 'P', 'Q', 'R', 'S', 'T', 'U', 'V', 'W', 'X', 'Y', 'Z', 'B1', 'B2', 'E1') and paths (e.g., '3241', '$', '241', '41', '1', and so on) connecting the nodes.

In an embodiment, the nodes of the suffix tree may represent a count of occurrences of a particular type of data pattern (e.g., node 'B' would represent a count of 4, since type of data pattern '3241' occurs 4 times in sensor node identifier data 502; node 'C' would represent a count of 5, since the type of data pattern '241' occurs 5 times in sensor node identifier data 502, and so on). The paths connecting the nodes may represent the particular types of data patterns.

To determine the compression logic and optimally compress the sensor node identifier dataset, the suffix tree may be traversed to determine non-overlapping nodes. A non-overlapping node may correspond to a annually exclusive type of data pattern. By way of example, consider node '1' of FIG. 5, the count of occurrence of type of data pattern '13241' is 2. The first match of type of data pattern (e.g., '13241') starts at $4^{th}$ position (e.g., row index in 502) and ends at $8^{th}$ position (e.g., row index in 502). The second match of type of data pattern starts at $8^{th}$ position (e.g., row index in 502) which overlaps with the occurrence of first match of type of data pattern. The third match of type of data pattern occurs at $15^{th}$ position (e.g., row index in 502) which does not overlap with the occurrence of second match of type of data pattern. Hence, the non-overlapping nodes may be determined as described above.

In an embodiment, upon determining the non-overlapping nodes in the suffix tree, data compression scores (e.g., first data compression score, second data compression score, etc.) for each non-overlapping node may be computed using Equation (1)). The data compression score may represent amount of memory utilized or consumed for storing a particular type of data pattern. The data compression logic may be determined based on the data compression scores and the sensor node identifier dataset may be optimally compressed and stored in the in-memory data store.

In an embodiment, the determination of non-overlapping nodes may be iteratively slopped. For instance, the execution of suffix tree algorithm to determine non-overlapping nodes may iteratively stop upon determination of an increase in type of data pattern, as the increase in length of type of data pattern may result in lower data compression scores. By way of example, in FIG. 5, nodes G and B2 would generate higher data compression scores in comparison to the data compression scores of nodes C and B respectively. Node G may be representing a type of data pattern of '2413241' which has a size of 7 bytes. In an embodiment, there may be an occurrence of at least two types of patterns in the dataset that includes 19 entries of records. Hence only 14 entries or records may be encoded and 5 records may not be encoded. Hence the amount of memory utilized or consumed by compressed dataset may be computed as: 7+2+5=14 bytes (e.g., without including the bit indicator for type of data pattern '2413241') which would be higher as compared to data compression score for type of data pattern '241' which may be computed as: 3+5+4=13 bytes (e.g., ignoring the bit indicator). The count of occurrence of type of data pattern '241' is 5 (e.g., in 502).

In an embodiment, a structured query language (SQL) query may be received by a data store search engine to search for data. Upon receiving the SQL query, the data store search engine may execute or perform a search in the in-memory data store. For instance, searching the data store may include traversing the compressed sensor node identifier dataset to determine a row index corresponding to the searched data. By way of example, consider the data store search engine receives a SQL query to search for data including sensor node identifier '3'. Upon processing the SQL query, the data store search engine may determine that the searched data is included in the frequently repetitive type of data pattern at $3^{rd}$ position (e.g., X, column store B of FIG. 3).

In an embodiment, the data store search engine may traverse the column store C of FIG. 3 and determine the corresponding value as '1' in bit-indicator column store D of FIG. 3. The row index corresponding to the search may be determined by computing a summation of current row index and the position of sensor node identifier that is being searched. The new current row index is determined in the matching row index list, after which the current row index is updated to the next row index by adding the remaining repetitively data type pattern length. By way of example, consider performing a linear search on column store C, such that first three records are compressed as indicated in column store ID and bit indicator of '1'. The position of sensor node identifier '3' may be determined based on the position (e.g., row index) within the frequently repetitive type of data pattern and the size of type of data pattern. Based on such a determination, the position for first three types of data patterns in compressed dataset may be determined as $3^{rd}$, $7^{th}$ and $11^{th}$. It may also be determined that each type of data pattern is of length 4 bytes and hence it may be determined that sensor identifier '2' is at $13^{th}$ position (e.g., 4*3+1=13 bytes), as the position is indexed from 1. Further searching in column store C, the sensor node with identifier '3' may be determined to be positioned at row index 14 and row index 16. Hence the compressed dataset is including the sensor node identifier '3' may be found at the row index 18.

In an embodiment, upon determining the bit-indicator value as '0', the sensor node identifier is stored in the compressed dataset so that value is compared for match. Upon matching, the current row index is added to the matching row index list and current row index is increment by '1'.

Compression of Sensor Node Timestamp Data

In an embodiment, the sensor nodes may transmit data to the datacenter at finite intervals of time. Such data may be referred to as sensor node timestamp data. The sensor node timestamp data may include information such as, sensor node identifier, timestamp data, sensor node measurement data, etc. In an embodiment, the sensor node timestamp data received by the datacenter may be stored in the delta storage associated with the in-memory data store. The sensor node timestamp data may be sorted in an order (e.g., ascending order or descending order) and stored in the delta storage. The sorted sensor timestamp data may be merged with the main storage associated with the in-memory data store by executing a data merge model.

In an embodiment, attributes associated with the sensor node timestamp data may be determined. The attributes associated with the sensor node timestamp data may correspond to information, such as a "START TIME", "NUMBER OF INTERVALS", "INTERVAL", "NUMBER OF SENSOR NODES", etc. In an embodiment, information associated with "START TIME" may represent a timestamp (e.g., measurement of time) at which the sensor node performed the measurement. The "START TIME" may be determined by determining the first value in the column store including the timestamp data. The parameter "NUMBER OF SENSOR NODES" may represent the number of unique sensor nodes that may transmit data. Such number may be determined by the sensor node identifiers. The information associated with "INTERVAL" may represent a value including a definite change in time (e.g., in Table 2, integer '1' represents 1 millisecond) by the sensor nodes. The "INTERVAL" may be determined based on a comparison between the sensor node timestamp values for a known instance of timestamp data. The information associated with "NUMBER OF INTERVALS" may represent finite sets of time intervals including a definite type of data pattern associated with the timestamp data. The "NUMBER OF INTERVALS" may be determined by traversing the timestamp data and optimally partitioning into interval blocks based on the timestamp data (e.g., Table 2, number 3 represents three intervals with each sensor measurement with one millisecond measurement for all four sensor nodes).

FIG. 6 is a block diagram showing compression of sensor node timestamp data, according to an embodiment. By way of illustration, FIG. 6 shows table 1 including sensor node timestamp data. As shown, table 1 includes sensor node timestamp data includes information such as, sensor node identifier data 602, timestamp data 604 and sensor node measurement data 606. In an embodiment, the sensor node timestamp data may be stored in column stores in the main storage associated with the in-memory data sore. By way of illustration, the column store associated with sensor node identifier data 602 includes integer identifiers, such as '1', '2', '3', and '4.'

In an embodiment, an amount of memory utilized to store the sensor node timestamp data shown in FIG. 6 may be determined. By way of example, the amount of memory consumed or utilized to store each row of data in the sensor node timestamp node is 4 bytes. Hence the total amount of memory utilized to store the sensor node timestamp data of FIG. 6 (e.g., finite size of data) may be computed as 48 bytes (e.g., no. of records or number of entries=12; amount of memory consumed by each entry or record is 4 bytes.) Such memory utilization or consumption may be reduced by compressing the sensor node timestamp data.

In an embodiment, to compress the sensor node timestamp data, the attributes including the information "START TIME" 608, "NUMBER OF INTERVALS" 610, "INTERVAL" 612, "NUMBER OF SENSOR NODES" 614, etc., may be determined. Determining the above attributes may correspond to determining the data compression logic. The above attributes may be determined by determining the type of data patterns associated with the sensor node timestamp data. In an embodiment, the sensor node timestamp data may be linearly traversed and may generate compressed dataset upon determining the change in interval between timestamps or a count of number of same timestamps. The change in timestamp is recorded as "INTERVAL" such as 1 millisecond in Table 2 of FIG. 6. In an embodiment, a change in the number of sensor nodes may generate compressed dataset including a row in Table 2 in FIG. 7.

In an embodiment, upon executing linear timestamp algorithm and determining the above attributes, Table 2 of FIG. 6 may be generated. Determining the above attributes may correspond to determining the data compression logic (e.g., sensor node timestamp data compression model) to compress the dataset associated with sensor node timestamp data. Table 2 in FIG. 6 shows attributes that may be determined from Table 1 upon execution of the linear timestamp algorithm. By way of illustration, Table 2 includes: "START TIME"=20141017145610 608; "NUMBER OF INTERVALS"=3 610 (e.g., 'N1', 'N2' and 'N3'); "INTERVAL"=1 612 (e,g., '1'); "NUMBER OF SENSOR NODES"=4 614 (e.g., with sensor node identifier '1', '2', '3', and '4'). In an embodiment, the above determined attributes of Table 2 may represent compressed dataset associated with the sensor node timestamp data.

In an embodiment, an amount of memory utilized or consumed by the compressed dataset (e.g., Table 2) may be computed as 7 bytes (e.g., 1*4 bytes corresponding to "START TIME" +1 byte corresponding to "NUMBER OF INTERVALS"+1 byte corresponding to "INTERVAL"+1 byte corresponding to "NUMBER OF SENSOR NODES"=4). Hence, the amount of memory consumed or utilized to store the sensor node timestamp data may be significantly reduced. For instance, from the above computations, it may be determined that upon compressing the dataset corresponding to the sensor node timestamp data, the amount of memory consumed may be reduced by approximately 85.4%.

In an embodiment, the amount of memory utilized or consumed by the sensor node timestamp data may be computed as:

$$\text{Total memory utilized or consumed by sensor node timestamp data}=4*M+3*M \quad \text{Equation (2)}$$

In the equation above, 'M' represents the number of records or entries in the table including the compressed dataset. In an embodiment, when the above determined information (e.g., "NUMBER OF INTERVALS", "INTERVAL", "NUMBER OF SENSOR NODES", etc.) is taken into consideration, a generalized equation may be generated. For instance, the generic form of Equation (2) may be written as:

$$\text{Total memory utilized or consumed by sensor node timestamp data}=4*M+\text{ceil}(\log_2 I_{max})*M+\text{ceil}(\log_2 T_{max})*M+\text{ceil}(\log_2 D_{total})*M \quad \text{Equation (3)}$$

In the equation above, 'M' represents number of records or entries; '$I_{max}$' represents maximum "NUMBER OF INTERVALS"; '$T_{max}$' represents maximum "INTERVAL"; '$D_{total}$' represents the maximum "NUMBER OF SENSOR NODES".

FIG. 7 is a block diagram showing compression of sensor node timestamp data, according to an embodiment. By way of illustration, FIG. 7 shows table 1 including sensor node timestamp data. As shown, the sensor node timestamp data includes information such as, sensor node identifier data 702, the timestamp data 704 and the sensor node measurement data 706. By way of example, the amount of memory consumed or utilized to store each row of data in the sensor node timestamp node is 4 bytes. Hence the total amount of memory utilized to store the sensor node timestamp data Table 1 of FIG. 7 may be computed as 60 (e.g., no. of records or number of entries=15; amount of memory consumed by each entry or record is 4 bytes.) Such memory utilization or consumption may be reduced by compressing the sensor node timestamp data.

In an embodiment, the attributes (e.g., "START TIME", "NUMBER OF INTERVALS", "INTERVAL", "NUMBER OF SENSOR NODES", etc.,) including the information associated with the sensor node timestamp data may be determined as described in detailed description of FIG. 6. By way of illustration, the attributes associated with sensor node timestamp data of FIG. 7 may be determined and compressed as shown in Table 2 of FIG. 7. By way of illustration, first row of Table 2 in FIG. 7 shows compressed data that includes: "START TIME"=20141017145610 708; "NUMBER OF INTERVALS"=3 710; "INTERVAL"=1 712; "NUMBER OF SENSOR NODES"=4 714.

By way of example, consider a scenario where the data center failed to receive data from a sensor node. For instance, consider that sensor node with identifier '1' failed to transmit data to the data center (e.g., on account of faulty sensor node, failed sensor node, failed communication link between the sensor node and the datacenter, etc.). By way of illustration, Table 1 in FIG. 7 shows such dataset corresponding to the last interval block (e.g., 'B1') and associated with timestamp data '20141017145613'. In such a scenario, the dataset may be compressed and stored as shown in second row of Table 2 in FIG. 7. In an embodiment, the second row of Table 2 in FIG. 7 indicates that information associated with timestamp data '20141017145613' and sensor node with identifier '1' failed to transmit data to the data center. Such a technique or mechanism of data compression of the sensor node timestamp data may be referenced as lossless compression as the original dataset including the timestamp data may be recovered from compressed data.

In an embodiment, the amount of memory utilized or consumed to store compressed dataset of Table 2 in FIG. 7 may be computed using Equation (2). The amount of memory consumed is computed to be equal to 14 bytes (e.g., 4*2+3*2). Hence, the amount of memory consumed or utilized to store the sensor node timestamp data may be significantly reduced. For instance, from the above computations, it may be determined that upon compressing the dataset corresponding to the sensor node timestamp data, the amount of memory consumed may be reduced by approximately 76.7%.

FIG. 8 is a block diagram showing tables including compressed dataset for sensor node timestamp data, according to an embodiment. By way of example, consider that number of records or entries in a table including sensor node timestamp data is 341. Hence the total amount of memory utilized to store the sensor node timestamp data may be computed as 1364 bytes (e.g., no. of records or entries=341; amount of memory consumed by each entry or record is 4 bytes.) Such memory utilization or consumption may be reduced by compressing the sensor node timestamp data.

In an embodiment, the dataset corresponding to the senor timestamp data may be compressed as explained previously (e.g., detailed description of FIG. 6 and FIG. 7). By way of illustration, Table 1 in FIG. 8 shows compressed dataset associated with the sensor node timestamp data. In an embodiment, the compressed dataset corresponding to the sensor node timestamp data as shown in Table 1 of FIG. 8 corresponds to different values of "START TIME" 802. Table 1 also includes information related to corresponding information, such as "NUMBER OF INTERVALS" 804, "INTERVALS" 806 and "NUMBER OF SENSOR NODES" 808.

In an embodiment, the amount of memory utilized or consumed to store the compressed dataset as shown in Table 1 of FIG. 8 may be computed and is equal to 98 bytes (e.g., 4*7+4*7+4*7+2*7). Hence, the amount of memory consumed or utilized to store the sensor node timestamp data may be significantly reduced. For instance, from the above computations, it may be determined that upon compressing the dataset corresponding to the sensor node timestamp data, the amount of memory consumed may be reduced by approximately 92.81%.

In an embodiment, the dataset corresponding to the senor timestamp data may be compressed as explained previously (e.g., detailed description of FIG. 6 and FIG. 7). By way of illustration, Table 2 in FIG. 8 shows compressed dataset associated with the sensor node timestamp data for different values of "START TIME" 810. In an embodiment, Table 2 in FIG. 8 shows column store including the row index (e.g., "START ROW POSITION" 812). The row index corresponds to start position of the timestamp in the original table (e.g., 704, of Table 1 in FIG. 7). Table 2 also includes the column store "INTERVALS" 814 and "NUMBER OF SENSOR NODES" 816.

In an embodiment, the amount of memory utilized or consumed to store the compressed dataset as shown in Table 2 of FIG. 8 may be computed and is equal to 98 bytes (e.g., 4*7+4*7+4*7+2*7). Hence, the amount of memory consumed or utilized to store the sensor node timestamp data may be significantly reduced. For instance, from the above computations, it may be determined that upon compressing the dataset corresponding to the sensor node timestamp data, the amount of memory consumed may be reduced by approximately 92.81%.

In an embodiment, a process to search the compressed dataset including the sensor node timestamp data may be optimized. The process of optimizing the search may include determining the searched dataset using a row index (e.g., a start row index '$R_s$'). For instance, consider the dataset is compressed and stored in the in-memory data store as shown in Table 1 of FIG. 8. By way of example, consider executing or performing a search on Table 1 in FIG. 8. Consider the search query includes searching for the dataset including the timestamp data '20141017145650.'

In an embodiment, a data store search engine may process the query to search for the dataset. In an embodiment, upon traversing through the column store of the compressed timestamp data (802 of Table 1 in FIG. 8.), the data store search engine may determine and select a row (e.g., in Table 1 of FIG. 8, $4^{th}$ row is selected (shown as shaded row), since the timestamp data in $4^{th}$ row is '20141017145642' and the searched timestamp data is '20141017145650').

In an embodiment, the business logic for selecting the row may include performing a binary search on the column store including the timestamp data. The binary search process may include determining a start time based on timestamp data. The process of binary search is terminated upon determining the timestamp data that is less than or equal to the searched timestamp data and the next timestamp in compressed data. (804 of Table 1 in FIG. 8.) is greater than searched timestamp.

In an embodiment, the start row index ('$R_s$') corresponding to the searched timestamp data '20141017145650' may be determined based on a business logic. For instance, the business logic may include determining a row index before the selected row. Such a row index may be referred to as a row index before computation, '$R_b$', which may be determined using the equation:

$$R_b=\Sigma_{i=1}^{K} I_i * D_i \qquad \text{Equation (3)}$$

In the equation above, 'i' represents the row index ($4^{th}$ row in reference to the above example); 'K' represents number of rows before the selected row; 'Ii' represents the "NUMBER OF INTERVALS" and '$D_i$' represents the "NUMBER OF SENSOR NODES."

In an embodiment, the business logic may further include determining a row index within the selected row. Such a row index may be referred to as row index within the selected row, '$R_w$' which may be determined using the equation:

$$Rw = \frac{(T - T_s)}{T_I} * D_s \qquad \text{Equation (5)}$$

In the equation above, 'T' represents the searched timestamp data; 'Ts' represents the timestamp data of the selected 's' row; 'Ds' represents the number of sensor nodes corresponding to the selected 's' row; $T_i$ represents the time "INTERVAL" of sensor node corresponding to the selected 's' row.

In an embodiment, '$R_s$' may be determined using the equation:

$$Rs = R_b + Rw \qquad \text{Equation (6)}$$

Using the above equations, '$R_s$' for the above searched timestamp data may be computed as: $R_b$=122 (e.g., 3*4+10*3+20*4); R=24 (e.g., (20141017145650−20141017145642)/1*3); R=146 (e.g., 122+24).

In an embodiment, since $D_s$=3, the data store search engine may determine that the row index range corresponding to the searched timestamp data '20141017145650' is 146, 147 and 148 (since the number of sensor nodes=$D_s$=3 and INTERVAL=$T_1$=1 milliseconds).

By way of example, consider that the timestamp data '20141017145650' may be searched in Table 2 of FIG. 8. In an embodiment, upon traversing through the column store including the timestamp data, the data store search engine may determine and select a row (e.g., in Table 2 of FIG. 8, $4^{th}$ row is selected (shown as shaded row), since the timestamp data in $4^{th}$ row is '20141017145642' and the searched timestamp data is '20141017145650'). In case of Table 2 of FIG. 8 we directly get the $R_b$ (example value 122 in Table 2 FIG. 8 shaded row) and $R_w$ is computed as above (as we did in Table 1, FIG. 8 case, e.g., (20141017145650−20141017145642)/1*3=24). As explained above, the row index range for the timestamp data '20141017145650' may be determined to be 146, 147 and 148 (since the number of sensor nodes=$D_s$=3 and time INTERVAL=$T_I$=1 milliseconds).

Compression of Sensor Node Measurement Data

In an embodiment, a dataset including sensor measurement data may be compressed and stored in an in-memory data store. The sensor measurement data may include measurements recorded by the senor nodes. By way of example, the sensor measurement data may correspond to measurements, such as, pressure, temperature, weight, capacity/volume, etc. In an embodiment, the dataset including the sensor measurement data may be compressed by executing a sensor measurement data compression model (e.g., sensor measurement data compression algorithms). The sensor measurement data may be compressed using compression techniques such as, run-length encoding, cluster coding, dictionary coding, etc.

In an embodiment, the dataset including the sensor measurement data may be compressed using the suffix tree algorithms and techniques (e.g., compression of sensor node identifier data). Data compression may have advantages such as, reduced data volumes that may require less main memory or hard disk capacity, reduced data flows, lower demands on processor architectures, network bandwidth, etc.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
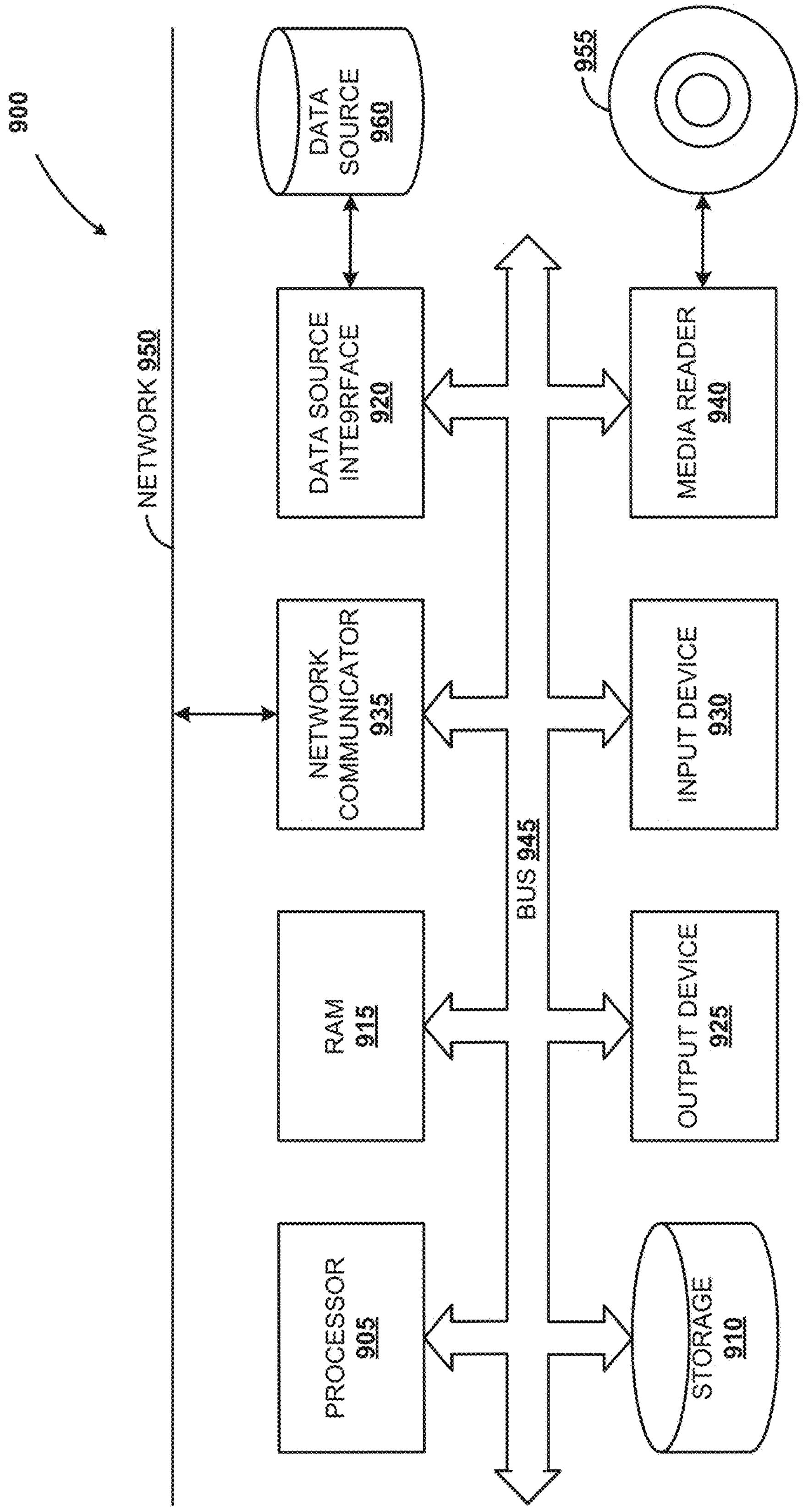
FIG. 9 is a block diagram of a computer system, according to an embodiment.

FIG. 9 is a block diagram of an exemplary computer system 900, according to an embodiment. Computer system 900 includes processor 905 that executes software instructions or code stored on computer readable storage medium 955 to perform the above-illustrated methods. Processor 905 can include a plurality of cores. Computer system 900 includes media reader 940 to read the instructions from computer readable storage medium 955 and store the instructions in storage 910 or in random access memory (RAM) 915. Storage 910 provides a large space for keeping static data where at least some instructions could be stored for later execution. According to some embodiments, such as some in-memory computing system embodiments, RAM 915 can have sufficient storage capacity to store much of the data required for processing in RAM 915 instead of in storage 910. In some embodiments, all of the data required for processing may be stored in RAM 915. The stored instructions may be further compiled to generate other representations of the instructions and dynamically stored in RAM 915. Processor 905 reads instructions from RAM 915 and performs actions as instructed. According to one embodiment, computer system 900 further includes output device 925 (e.g., a display) to provide at least some of the results of the execution as output including, but not limited to, visual information to users and input device 930 to provide a user or another device with means for entering data and/or otherwise interact with computer system 900. Each of these output devices 925 and input devices 930 could be joined by one or more additional peripherals to further expand the capabilities of computer system 900. Network communicator 935 may be provided to connect computer system 900 to network 950 and in turn to other devices connected to network 950 including other clients, servers, data stores, and interfaces, for instance. The modules of computer system 900 are interconnected via bus 945. Computer system 900 includes a data source interface 920 to access data source 960. Data source 960 can be accessed via one or more abstraction layers implemented in hardware or software. For example, data source 960 may be accessed by network 950. In some embodiments data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to compress a dataset, comprising:

based on one or more attributes associated with a unified dataset stored in an in-memory data store, determining a dataset including sensor node identifier data, sensor node timestamp data and sensor measurement data;

determining at least one frequently repetitive type of data pattern in the sensor node identifier data based on a data transmission frequency from a plurality of sensor nodes, wherein the sensor node identifier data includes one or more types of data patterns and a first type of data pattern is associated with a first data transmission frequency and a second type of data pattern is associated with a second data transmission frequency, and at least one of the first type of data pattern and the second type of data pattern is the frequently repetitive type of data pattern based on a respective count of the first type and the second type of data pattern;

determining a first data compression logic to compress the sensor node identifier data based on the determined at least one frequently repetitive type of data pattern, wherein the first data compression logic determines a position of a missing sensor node identifier in the determined at least one frequently repetitive type of data pattern wherein compression reduces an amount of memory the sensor node identifier data uses in the in-memory data store; and determining a second data compression logic to compress the sensor measurement data, wherein the determination of the second data compression logic is based on determining a type of data pattern associated with the sensor measurement data, wherein compression reduces an amount of memory the sensor measurement data uses in the in-memory data store;

executing a sensor node timestamp data compression model to compress the sensor node timestamp data, wherein compression reduces an amount of memory the sensor node timestamp data uses in the in-memory data store; and storing the compressed sensor node identifier data, the compressed sensor measurement data and the compressed sensor node timestamp data in the in-memory data store.

2. The computer implemented method of claim 1, wherein the at least one frequently repetitive type of data pattern is based on:

determining one or more types of data patterns associated with the sensor node identifier data.

3. The computer implemented method of claim 1, wherein determining the first data compression logic, further comprises:

generating a suffix tree including the sensor node identifier data, the suffix tree including a plurality of nodes and a plurality of paths connecting the plurality of nodes;

determining one or more non-overlapping nodes from the plurality of nodes;

for the determined one or more non-overlapping nodes, computing data compression scores corresponding to the one or more non-overlapping nodes; and based on a comparison of the computed data compression scores, determining the first data compression logic.

4. The computer implemented method of claim 1, wherein determining the second data compression logic, comprises:

based on a data transmission frequency from the plurality of sensor nodes, determining one or more types of data patterns associated with the sensor measurement data; and from the determined one or more type of data patterns, determining at least one frequently repetitive type of data pattern.

5. The computer implemented method of claim 1, wherein determining the data compression logic of sensor timestamp, comprises: determining start time, the count of number of intervals, interval duration and number of unique sensors based on a sorted timestamp information and a data transmission frequency from a plurality of sensor nodes.

6. The computer implemented method of claim 1, further comprising:

upon determining the first data compression logic, encoding the dataset including the sensor identifier data by a bit-coding logic to compress the dataset corresponding to the sensor node identifier data.

7. The computer implemented method of claim 1, wherein the compressed dataset is optimized to search for data.

8. The computer implemented method of claim 1, further comprising:

receiving the dataset including sensor node identifier data, sensor node timestamp data and sensor measurement data from the plurality of sensor nodes;

storing the received dataset in a delta storage associated with the in-memory data store; and upon sorting the dataset based on a timestamp information, merging the dataset stored in the delta storage with a main storage associated with the in-memory data store.

9. The computer implemented method of claim 1, wherein compression of the sensor node timestamp data further comprises:

determining one or more attributes associated with the sensor node timestamp data by determining a definite type of data pattern associated with sensor node timestamp data.

10. The computer implemented method of claim 1, wherein the sensor node timestamp data compression model determines a change in an interval between timestamps or a count of a number of same timestamps to compress the sensor node timestamp data.

11. A computer system to compress a dataset, comprising:

a memory storing computer instructions; and a processor communicatively coupled with the memory to execute the instructions related to:

based on one or more attributes associated with a unified dataset stored in an in-memory data store, determine a dataset including sensor node identifier data, sensor node timestamp data and sensor measurement data;

determine at least one frequently repetitive type of data pattern in the sensor node identifier data based on a data transmission frequency from a plurality of sensor nodes, wherein the sensor node identifier data includes one or more types of data patterns and a first type of data pattern is associated with a first data transmission frequency and a second type of data pattern is associated with a second data transmission frequency, and at least one of the first type of data pattern and the second type of data pattern is the frequently repetitive type of data pattern based on a respective count of the first type and the second type of data pattern;

determine a first data compression logic to compress the sensor node identifier data based on the determined at least one frequently repetitive type of data pattern, wherein the first data compression logic determines a position of a missing sensor node identifier in the determined at least one frequently repetitive type of data pattern, wherein compression reduces an amount of memory the sensor node identifier uses in the in-memory data store; and determine a second data compression logic to compress the sensor measurement data, wherein the determination of the second data compression logic is based on determining a type of data pattern associated with the sensor measurement data, wherein compression reduces an amount of memory the sensor measurement data uses in the in-memory data store;

execute a sensor node timestamp data compression model to compress the sensor node timestamp data, wherein compression reduces an amount of memory the sensor node timestamp data uses in the in-memory data store; and store the compressed sensor node identifier data, the compressed sensor measurement data and the compressed sensor node timestamp data in the in-memory column data store.

12. The computer system of claim 11, wherein the at least one frequently repetitive type of data pattern is based on:

determining one or more types of data patterns associated with the sensor node identifier data.

13. The computer system of claim 11, wherein determining the first data compression logic, further comprises:

generating a suffix tree including the sensor node identifier data, the suffix tree including a plurality of nodes and a plurality of paths connecting the plurality of nodes;

determining one or more non-overlapping nodes from the plurality of nodes;

for the determined one or more non-overlapping nodes, computing data compression scores corresponding to the one or more non-overlapping nodes; and based on a comparison of the computed data compression scores, determining the first data compression logic.

14. The computer system of claim 11, wherein determining the second data compression logic, comprises:

based on a data transmission frequency from the plurality of sensor nodes, determining one or more types of data patterns associated with the sensor measurement data; and from the determined one or more type of data patterns, determining at least one frequently repetitive type of data pattern.

15. The computer system of claim 11, wherein determining the data compression logic of sensor timestamp, comprises: determining start time, the count of number of intervals, interval duration and number of unique sensors based on a sorted timestamp information and a data transmission frequency from a plurality of sensor nodes.

16. The computer system of claim 11, further comprising:

upon determining the first data compression logic, encode the dataset including the sensor identifier data by a bit-coding logic to compress the dataset corresponding to the sensor node identifier data.

17. The computer system of claim 11, wherein the compressed dataset is optimized to search for data.

18. The computer system of claim 11, further comprising:

receiving the dataset including sensor node identifier data, sensor node timestamp data and sensor measurement data from the plurality of sensor nodes;

storing the received dataset in a delta storage associated with the in-memory data store; and upon sorting the dataset based on a timestamp information, merging the dataset stored in the delta storage with a main storage associated with the in-memory data store.

19. A non-transitory computer readable storage medium tangibly storing instructions, which when executed by a computer, cause the computer to execute operations comprising:

based on one or more attributes associated with a unified dataset stored in an in-memory data store, determine a dataset including sensor node identifier data, sensor node timestamp data and sensor measurement data;

determine at least one frequently repetitive type of data pattern in the sensor node identifier data based on a data transmission frequency from a plurality of sensor nodes, wherein the sensor node identifier data includes one or more types of data patterns and a first type of data pattern is associated with a first data transmission frequency and a second type of data pattern is associated with a second data transmission frequency, and at least one of the first type of data pattern and the second type of data pattern is the frequently repetitive type of data pattern based on a respective count of the first type and the second type of data pattern;

determine a first data compression logic to compress the sensor node identifier data based on the determined at least one frequently repetitive type of data pattern, wherein the first data compression logic determines a position of a mission sensor node identifier in the determined at least one frequently repetitive type of data pattern, wherein compression reduces an amount of memory the sensor node identifier data uses in the in-memory data store; and determine a second data compression logic to compress the sensor measurement data, wherein the determination of the second data compression logic is based on determining a type of data pattern associated with the sensor measurement data, wherein compression reduces an amount of memory the sensor measurement data uses in the in-memory data store;

execute a sensor node timestamp data compression model to compress the sensor node timestamp data, wherein compression reduces an amount of memory the sensor node timestamp data uses in the in-memory data store; and store the compressed sensor node identifier data, the compressed sensor measurement data and the compressed sensor node timestamp data in the in-memory data store.

20. The non-transitory computer readable storage medium of claim 19, wherein the at least one frequently repetitive type of data pattern is based on:

determining one or more types of data patterns associated with the sensor node identifier data.

21. The non-transitory computer readable storage medium of claim 19, wherein determining the first data compression logic, further comprises:

generating a suffix tree graph including the sensor node identifier data, the suffix tree including a plurality of nodes and a plurality of paths connecting the plurality of nodes;

determining one or more non-overlapping nodes from the plurality of nodes;

for the determined one or more non-overlapping nodes, computing data compression scores corresponding to the one or more non-overlapping nodes; and based on a comparison of the computed data compression scores, determining the first data compression logic.

22. The non-transitory computer readable storage medium of claim 19, wherein determining the second data compression logic, comprises:

determining one or more types of data patterns associated with sensor node timestamp data based on a sorted timestamp information and a data transmission frequency from a plurality of sensor nodes;

from the determined one or more types of data patterns associated with sensor node timestamp data, determining a start time, a count of a number of intervals, one or more intervals and number of sensor nodes; and based on the determined start time, the count of number of intervals, one or more intervals and the number of sensor nodes, compressing the dataset including the sensor node timestamp data.

* * * * *